United States Patent [19]
Dworkis

[11] 4,123,924
[45] Nov. 7, 1978

[54] IGNITION SWITCH LOCK

[76] Inventor: Ronald Dworkis, 14-12 Chandler Dr., Fairlawn, N.J. 07410

[21] Appl. No.: 792,141

[22] Filed: Apr. 29, 1977

[51] Int. Cl.² .................................................. E05B 17/14
[52] U.S. Cl. ........................................ 70/237; 70/424; 70/428; 180/114
[58] Field of Search ............... 70/428, 427, 423, 424, 70/14, 19, 232, 237, 168, 172, 179, 455, DIG. 56, DIG. 58; 180/114

[56] References Cited

U.S. PATENT DOCUMENTS

| | | | |
|---|---|---|---|
| 1,464,854 | 8/1923 | Rose | 70/428 X |
| 3,635,057 | 1/1972 | Foote | 70/428 X |
| 3,763,675 | 10/1973 | Hofmeister et al. | 70/232 |
| 3,820,283 | 6/1974 | Acerra et al. | 70/14 X |
| 3,866,445 | 2/1975 | Erwin | 70/428 |
| 3,916,658 | 11/1975 | Barry | 180/114 X |
| 3,948,069 | 4/1976 | Imbriano | 70/428 |
| 4,020,662 | 5/1977 | Fowler | 70/237 |

FOREIGN PATENT DOCUMENTS 2,316,448 10/1974 Fed. Rep. of Germany ............ 70/14

*Primary Examiner*—Rodney H. Bonck
*Attorney, Agent, or Firm*—Gottlieb, Rackman & Reisman

[57] ABSTRACT

An ignition switch lock for preventing unauthorized access to the ignition switch of an automobile or similar vehicle is disclosed. The ignition switch lock includes a housing, one end of which is shaped to conform to the contours of a steering column. The device further includes a pair of movable jaws which may be moved into engagement with and locked around the rotatable portion of the ignition switch, and means for selectively controlling the movement of the jaws for securement of the device to the steering column.

3 Claims, 6 Drawing Figures

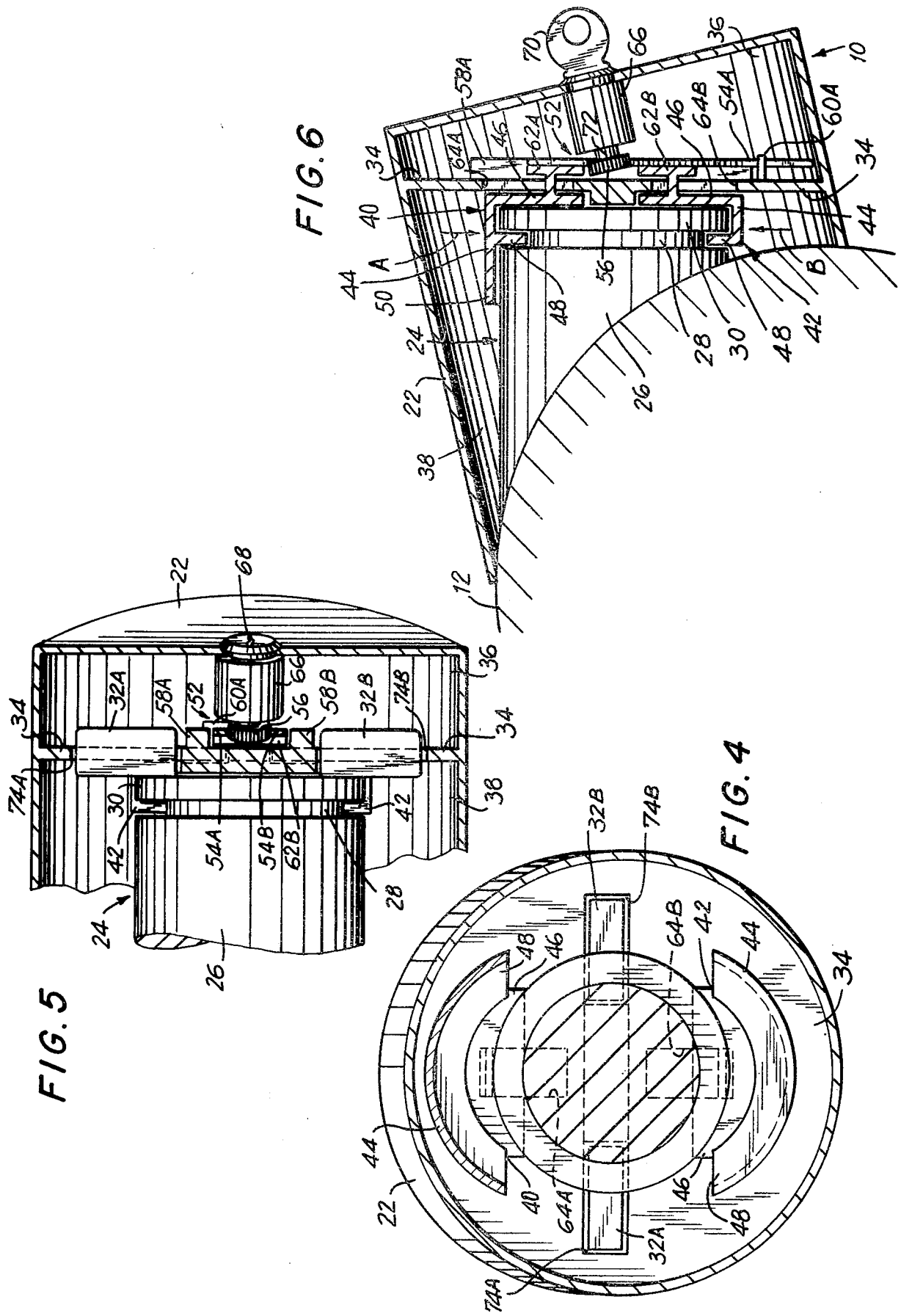

IGNITION SWITCH LOCK

This invention relates generally to motor vehicles, and more specifically, to an improved ignition switch lock for automobiles and similar vehicles.

As a result of the steadily increasing rate at which automobiles are stolen in the United States and elsewhere, most automobile manufacturers have recently begun to incorporate various security devices into the vehicles which they produce in order to protect the large investment of the consumer who purchases such a vehicle. One of these security devices with which most recent-model automobiles are equipped is an ignition switch which is mounted on the steering column and which is linked to a locking mechanism for the steering column and for the automobile's transmission. Although these ignition switches were designed to reduce auto theft, they are far from being totally foolproof. It has been found that this mechanism can be overcome by simply breaking the ignition switch from its mounting on the steering column. This can be accomplished, for example, by forcing a screw into the keyway of the ignition switch, and then pulling the whole mechanism out. Once the ignition switch is removed, the transmission lock becomes disengaged, and the automobile can thereafter be "jump-started" and driven away.

Various attempts to enhance the security of automobile ignition switches by means of supplementary locking devices have been made in the past. An example of such prior art supplementary devices may be found in U.S. Pat. No. 3,916,658, which discloses a protective device having a continuous band encircling the steering column and securing a rotatable cap over the ignition switch. The cap is provided with a keyway which is aligned with the keyhole of the ignition switch, permitting insertion of the ignition key to operate the automobile.

This device is unsatisfactory in several respects. First, although a major portion of the ignition switch assembly is protected, the keyway of the ignition switch is still exposed, thereby permitting theft of the automobile in the manner described above. Also, this device cannot be removed easily and transferred from one automobile to another — in fact, it probably must be destroyed in order to remove it. Moreover, it has several parts which must be assembled by the user, and if it is assembled incorrectly, it may be rendered unusable, and damage to the steering column and ignition switch may result.

Other prior art security devices are shown in U.S. Pat. No. 3,811,303 and U.S. Pat. No. 3,665,738. Both of these devices are protective guards which fit over the ignition switch or completely encase the steering column in the vicinity of the ignition switch. However, both devices are secured to the steering column by conventional padlocks, and therefore are easily removable by means of a cutting device such as a lock cutter.

It is therefore the principal object of this invention to provide an ignition switch lock which is extremely secure and may only be removed by an authorized user of the automobile.

Another object of this invention is to provide an ignition switch lock which completely covers the ignition switch, thereby preventing access to the ignition switch keyway.

It is a further object of this invention to provide an ignition switch lock which is completely interchangeable from automobile to automobile.

A still further object of this invention is to provide an ignition switch lock which is completely preassembled, requiring no construction by the user in order to make it possible.

Briefly, in accordance with the principles of this invention, an ignition switch lock which is adapted to fit over the conventional steering column ignition switch is provided with means for engaging the rotatable portion of the ignition switch assembly. The engaging means preferably includes a pair of clamps or jaws which are reciprocable between locked and unlocked positions. The jaws are shaped such that when they are in the locked position, they fit into corresponding recesses in the conventional ignition switch assembly.

The device is further provided with means for selective activation of the engaging means, preferably comprising a key-operated rack and pinion assembly which is linked to and controls the reciprocation of the jaws. When properly oriented, the device may be placed over the ignition switch of an automobile and "locked" in place by use of a separate key.

It is therefore a feature of an embodiment of this invention that an ignition switch lock is provided with reciprocable jaws which securely engage and surround the conventional automobile ignition switch assembly, thereby preventing access to the underlying ignition switch.

Another feature of an embodiment of this invention is that an ignition switch lock is provided with a control mechanism comprised of a rack and pinion assembly and a conventional key-operated lock.

Still another feature of an embodiment of this invention is that an ignition switch lock is provided with an exterior casing, one end of which is shaped to conform to the contours of a conventional automobile steering column, thereby preventing removal of the device by turning or twisting.

Further objects, features and advantages of this invention will become more readily apparent from an examination of the following specification, when taken in conjunction with the accompanying drawings, wherein:

FIG. 4 is a cross-sectional view of the interior of the ignition switch lock, taken along line 4—4 of FIG. 2 in the direction of the arrows;

FIG. 5 is a top cross-sectional view of the interior of the ignition switch lock, taken along line 5—5 of FIG. 2 in the direction of the arrows; and FIG. 6 is a cross-sectional view of the interior of the ignition switch lock which is similar to FIG. 2, but showing the device in the locked position.

Figure 1:
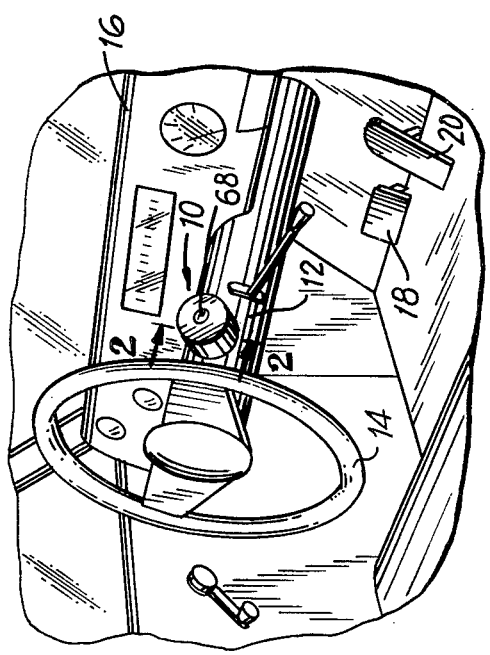
FIG. 1 is a perspective view of an ignition switch lock constructed according to a preferred embodiment of this invention, shown attached to a conventional automobile steering column.

Referring now to the drawings, and specifically to FIG. 1, an ignition switch lock embodying the principles of the present invention is generally designated 10. Ignition switch lock 10 is mounted over the ignition switch assembly (not shown in FIG. 1), which is located on a substantially cylindrical steering column 12. As shown in FIG. 1, ignition switch lock 10 is adapted to be used in the passenger compartment of an automobile, containing other conventional automobile parts such as steering wheel 14, dashboard 16, brake pedal 18, and accelerator pedal 20.

Referring now, in addition, to FIGS. 2-5, ignition switch lock 10 has an outer casing 22 which is substantially cylindrical in shape, but which conforms on its inner end to the contours of the outer surface of steering column 12. As shown best in FIG. 2, the shape of casing 22 is chosen so that the inner end surface of ignition switch lock 10, when properly oriented, fits snugly against steering column 12.

Figure 2:
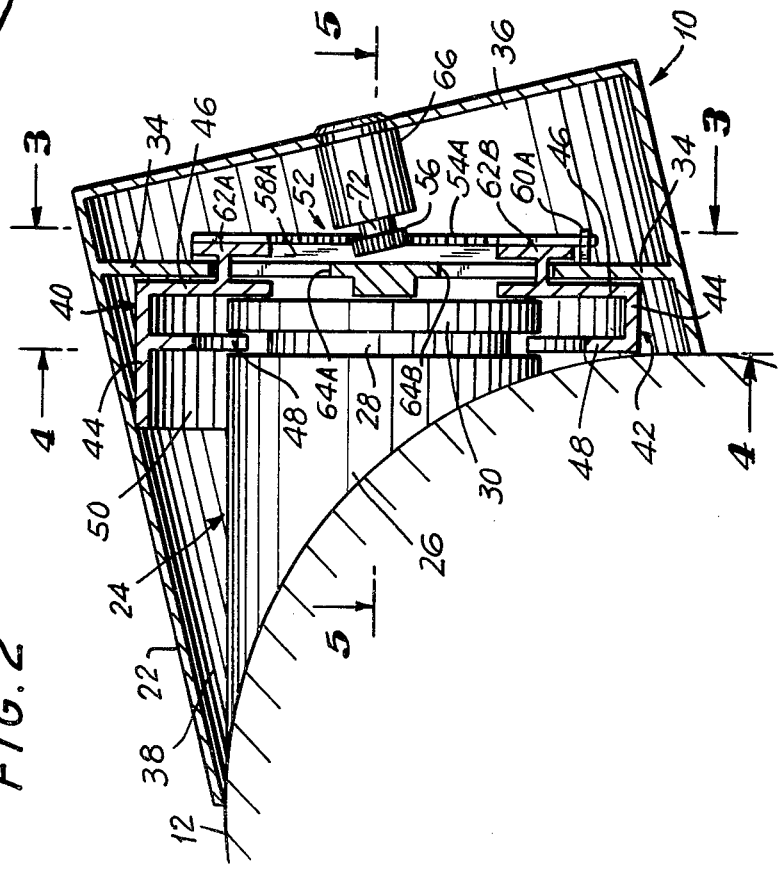
FIG. 2 is an enlarged side cross-sectional view of the interior of the ignition switch lock, shown in the unlocked position, the view being taken along line 2—2 of FIG. 1 in the direction of the arrows.

As also best shown in FIG. 2, ignition switch lock 10 is mounted directly over ignition switch assembly 24, which protrudes from steering column 12. Ignition switch assembly 24 comprises a base 26, a neck 28, a collar 30, a pair of tangs 32A, 32B (see FIG. 5), and a keyway (not shown). The construction of ignition switch assembly 24 is conventional, and has become standard in the automobile industry in the United States.

Ignition switch lock 10 is provided with a partition 34 which divides its interior into an upper compartment 36 and a lower compartment 38 (see FIG. 2). Lower compartment 38 contains means for engaging ignition switch assembly 24. In the preferred embodiment, the aforesaid engaging means comprises a pair of movable jaws 40, 42, which are similar to one another in construction. The shape of jaws 40, 42 is chosen so as to facilitate their engagement with ignition switch assembly 24, as described hereinbelow. As shown best in FIG. 4, each jaw has a semicircular outer wall 44, an inwardly projecting tongue 46, and an inwardly projecting semicircular lip 48. It will be seen that the shape of each jaw is generally complementary to that of ignition switch assembly 24. In order to accommodate the shape of ignition switch base 26, the outer wall 44 of jaw 40 carries an extension 50 which is absent from jaw 42 (see FIG. 2).

Referring now to FIG. 6 as well, jaws 40, 42 are reciprocable between an unlocked position, shown in FIGS. 2-5, and a locked position, shown in FIG. 6. As shown most clearly in FIGS. 2 and 3, upper compartment 36 contains means for controlling the reciprocation of jaws 40, 42 between their locked and unlocked positions. The aforesaid control means includes a rack and pinion assembly, generally designated 52, comprising a pair of toothed racks 54A, 54B, and a rotatable toothed gear or pinion 56, the teeth of which are meshed with those of racks 54A, 54B.

Rack and pinion assembly 52 further comprises means for guiding the movement of racks 54A, 54B. The guiding means includes a pair of lateral rack guides 58A, 58B, and a pair of slotted rack guides 60A, 60B (see FIG. 3).

Rack and pinion assembly 52 also includes a pair of sliders 62A, 62B, which connect jaws 40, 42 to racks 54A, 54B, respectively. As shown in FIGS. 2, 4 and 6, sliders 62A, 62B extend from upper compartment 36 to lower compartment 38 through openings 64A, 64B in partition 34. Thus, any movement of racks 54A, 54B is imparted to jaws 40, 42 by means of intermediate sliders 62A, 62B.

The aforesaid control means also includes means for selectively rotating pinion 56, comprising a rotatable lock cylinder 66 located in upper compartment 36. One end of lock cylinder 66 protrudes through outer casing 22 of ignition switch lock 10, and has a keyway 68 (see FIGS. 1 and 5) which accepts a key 70 (see FIG. 6). Keyway 68 is illustratively shown in FIGS. 1 and 5 as accepting a key 70 having a conventional toothed key blade (not shown), which is preferably keyed differently from the ignition key of the vehicle. However, in a preferred alternative embodiment, lock cylinder 66 may be a "pick-proof" lock which accepts only a circular key. Such a lockset is known in the trade as a tubular lockset, and is available from the Chicago Lock Company of Chicago, Illinois.

At its other end, lock cylinder 66 carries a connecting member 72 of reduced diameter, through which the rotational movement of lock cylinder 66 is imparted to pinion 56.

Turning now to the use and operation of ignition switch lock 10, after the owner or other authorized operator of an automobile has brought the vehicle to a halt, turned off the ignition switch, and removed the ignition key, ignition switch lock 10 may be oriented over the ignition switch assembly 24. As an aid in the alignment process, partition 34 has a pair of openings 74A, 74B which accommodate ignition switch tangs 32A, 32B, as shown most clearly in FIGS. 3-5. After ignition switch lock 10 has been positioned such that tangs 32A, 32B protrude through openings 74A, 74B (see FIG. 5), and the contours of the lock 10 have been matched with those of steering column 12, lock 10 will be mounted in the unlocked position as shown in FIG. 2.

In order to secure ignition switch lock 10 to steering column 12, key 70 must be inserted in keyway 68 and rotated. The rotational movement of lock cylinder 66 is conveyed to pinion 56 through connecting member 72. Rotation of pinion 56 causes rack 54A to move downward, as viewed in FIGS. 2, 3 and 6, while rack 54B is moved upward. The movement of racks 54A, 54B is guided by lateral rack guides 58A, 58B and slotted rack guides 60A, 60B.

Continued rotation of key 70 eventually carries rack 54A from the position shown in FIG. 2 to the position shown in FIG. 6, while rack 54B (not shown) is similarly moved in the opposite direction. As a result of the movement of racks 54A, 54B, sliders 62A, 62B are moved towards pinion 56 (compare FIGS. 2 and 6), carrying jaw 40 in the direction of arrow A and jaw 42 in the direction of arrow B. As shown in FIG. 6, when jaws 40, 42 are in the locked position, they engage with ignition switch assembly 24 and grip it securely, with semicircular lips 48 fitting into the recess around neck 28 while tongues 46 and semicircular walls 44 surround the collar 30 and base 26 of ignition switch assembly 24.

After jaws 40, 42 have been locked in place, the user may remove key 70, and the ignition switch will be properly protected until the vehicle is needed again for use by the owner or other authorized operator. It will be seen that neither the ignition switch nor the transmission lock of the automobile can be tampered with by vandals or thieves as long as ignition switch lock 10 is locked in place.

Figure 3:
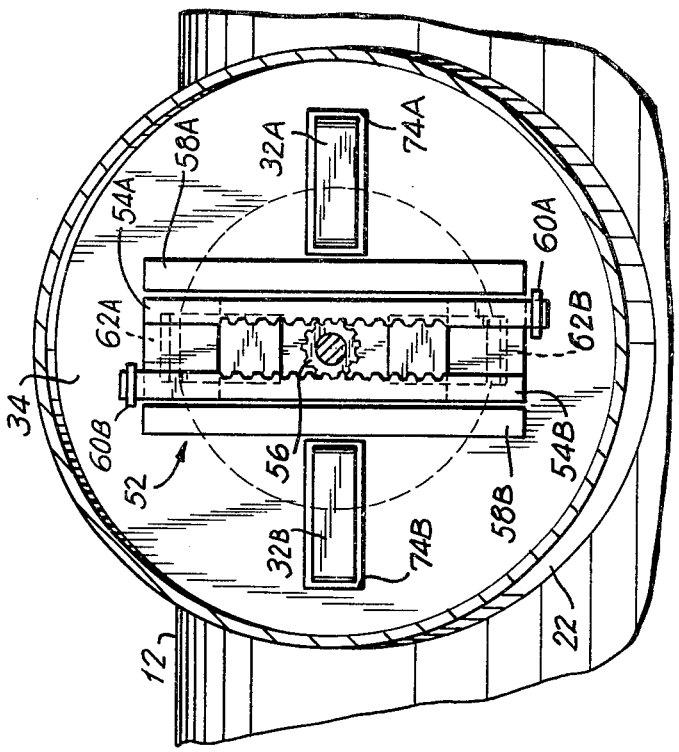
FIG. 3 is a cross-sectional view of the interior of the ignition switch lock, taken along line 3—3 of FIG. 2 in the direction of the arrows.

When the owner or other authorized user wishes to operate the vehicle again, ignition switch lock 10 may be disengaged from steering column 12 by inserting key 70 into keyway 68 and rotating it in the opposite direction. As pinion 56 rotates, rack 54A is moved from the position shown in FIG. 6 to the position shown in FIG. 2, and the corresponding movement is imparted to rack 54B (not shown). After continued rotation of key 70, racks 54A, 54B are positioned as shown in FIG. 3, and jaws 40, 42 have been carried away from ignition switch assembly 24 by sliders 62A, 62B (see FIG. 2). Ignition switch lock 10 may then be removed from steering column 12 and stored for later use. The owner or other authorized user may then insert the ignition key of the vehicle, start the vehicle in the conventional manner, and operate the vehicle as desired.

It will be seen that because of the construction of jaws 40, 42, the removal of ignition switch lock 10 without the appropriate key is impossible when jaws 40, 42 are securely locked in place around the ignition switch, as shown in FIG. 6. Moreover, ignition switch lock 10 is completely interchangeable, and can be retained by its owner for use on any automobile having its ignition switch mounted on the steering column. If the owner buys a new automobile, he can easily transfer the device to it before he disposes of his previous vehicle. Further, since the device is preassembled, and is shaped to correspond to the contours of the steering column, it is virtually impossible for the user to apply the device incorrectly and possibly damage it or his vehicle.

It may be seen from the foregoing that the embodiment described herein is by way of illustration and not of limitation, and that various changes in and other modifications of the construction, composition, and arrangement of parts is possible in light of the above teachings. Accordingly, it is to be understood that other embodiments of this invention may be utilized without departing from the spirit and scope of the present invention, as set forth in the appended claims.

What I claim is:

1. An ignition switch lock for securement to an ignition switch mounted on the steering column of a vehicle; said steering column being substantially cylindrical in shape and having a first axis, and said ignition switch having a stationary segment fixed to said steering column and a movable segment rotatable with respect to said stationary segment about a second axis substantially perpendicular to said first axis and spaced from said stationary segment to define an annular gap therebetween; said ignition switch lock comprising
    (a) a substantially cylindrical housing having one end surface shaped to mate with and conform to the contours of the circumference of said steering column coaxially with said second axis,
    (b) means for engaging the movable segment of said ignition switch comprising at least one movable jaw having at least one semi-circular lip thereon and adapted to move reciprocally between a locked position in mating engagement with said annular gap and an unlocked position out of mating engagement with said annular gap, and
    (c) means for controlling the reciprocation of said at least one movable jaw between said locked position and said unlocked position comprising
        (i) at least one rack corresponding to and linked to said at least one movable jaw, said at least one rack having a plurality of teeth thereon,
        (ii) a rotatable pinion having a plurality of teeth distributed about the circumference thereof for meshing engagement with and linear displacement of said at least one rack,
        (iii) means for guiding said linear displacement of said at least one rack, and
        (iv) means for selective rotation of said pinion.

2. An ignition switch lock in accordance with claim 1 wherein said means for engaging the movable segment of said ignition switch comprises two movable jaws, and wherein said means for controlling the reciprocation includes two racks, each said rack corresponding to and linked to one of said two jaws.

3. An ignition switch lock in accordance with claim 2 wherein said means for selective rotation of said pinion comprises key-operated lock means.

* * * * *